US011795879B2

(12) United States Patent
Venkatesan et al.

(10) Patent No.: US 11,795,879 B2
(45) Date of Patent: Oct. 24, 2023

(54) COMBUSTOR WITH AN IGNITER PROVIDED WITHIN AT LEAST ONE OF A FUEL INJECTOR OR A COMPRESSED AIR PASSAGE

(71) Applicant: General Electric Company, Schenectady, NY (US)

(72) Inventors: Krishnakumar Venkatesan, Niskayuna, NY (US); Michael A. Benjamin, Cincinatti, OH (US); Michael T. Bucaro, Arvada, CO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/589,145

(22) Filed: Jan. 31, 2022

(65) Prior Publication Data

US 2023/0193829 A1    Jun. 22, 2023

Related U.S. Application Data

(60) Provisional application No. 63/291,629, filed on Dec. 20, 2021.

(51) Int. Cl.
*F02C 7/266* (2006.01)
*F23R 3/28* (2006.01)
*F02C 7/232* (2006.01)

(52) U.S. Cl.
CPC .............. *F02C 7/266* (2013.01); *F23R 3/286* (2013.01); *F02C 7/232* (2013.01); *F23R 3/28* (2013.01); *F23R 2900/00006* (2013.01); *F23R 2900/00009* (2013.01)

(58) Field of Classification Search
CPC .............. F23R 3/28; F23R 2900/00006; F23R 2900/00009; F23R 3/34; F23R 3/343; F23R 3/346; F02C 7/264; F02C 7/266
See application file for complete search history.

(56) References Cited

U.S. PATENT DOCUMENTS

| 3,548,592 | A | * | 12/1970 | Hopkins | F23R 3/283 |
| | | | | | 60/39.827 |
| 3,800,530 | A | * | 4/1974 | Nash | F02C 7/264 |
| | | | | | 60/761 |
| 4,023,351 | A | * | 5/1977 | Beyler | F02C 7/266 |
| | | | | | 60/742 |
| 4,825,658 | A | | 5/1989 | Beebe | |
| 5,163,287 | A | * | 11/1992 | Shekleton | F23R 3/28 |
| | | | | | 60/39.821 |
| 5,367,869 | A | * | 11/1994 | DeFreitas | F23D 11/36 |
| | | | | | 60/776 |
| 5,587,630 | A | | 12/1996 | Dooley | |

(Continued)

FOREIGN PATENT DOCUMENTS

| RU | 2099572 C1 | 12/1997 |
| WO | 9220913 A1 | 11/1992 |
| WO | 2017002075 A2 | 1/2017 |

*Primary Examiner* — William H Rodriguez
(74) *Attorney, Agent, or Firm* — McGarry Bair PC

(57) ABSTRACT

A turbine engine comprising a compressor section, a combustion section having a combustor, and a turbine section in serial flow arrangement. The combustor having a combustion chamber, at least one fuel injector, at least one compressed air passage, and at least one igniter. The at least one igniter can be provided within a portion of the at least one fuel injector or the at least one compressed air passage.

20 Claims, 3 Drawing Sheets

(56) References Cited

U.S. PATENT DOCUMENTS

| | | | |
|---|---|---|---|
| 5,628,180 A | 5/1997 | DeFreitas | |
| 5,689,949 A * | 11/1997 | DeFreitas | F02P 23/045 |
| | | | 219/121.36 |
| 6,038,861 A * | 3/2000 | Amos | F23R 3/34 |
| | | | 60/737 |
| 7,669,406 B2 | 3/2010 | Tangirala et al. | |
| 7,739,867 B2 | 6/2010 | Kenyon et al. | |
| 9,423,133 B2 * | 8/2016 | Gomez del Campo | F23R 3/14 |
| 10,280,830 B2 | 5/2019 | Thomassin et al. | |
| 10,865,699 B2 | 12/2020 | Thomassin et al. | |
| 2002/0092302 A1 * | 7/2002 | Johnson | F23C 99/00 |
| | | | 60/737 |
| 2004/0255594 A1 * | 12/2004 | Baino | F02C 9/26 |
| | | | 60/773 |
| 2009/0071158 A1 * | 3/2009 | Cazalens | F23R 3/286 |
| | | | 60/737 |
| 2009/0165436 A1 * | 7/2009 | Herbon | F23R 3/343 |
| | | | 60/737 |
| 2012/0304651 A1 | 12/2012 | Patel et al. | |
| 2013/0104520 A1 | 5/2013 | Chyou et al. | |
| 2015/0184858 A1 * | 7/2015 | Stuttaford | F23R 3/346 |
| | | | 60/776 |
| 2015/0323187 A1 * | 11/2015 | Gomez del Campo | F02C 7/266 |
| | | | 60/737 |
| 2020/0224877 A1 * | 7/2020 | Gomez Del Campo | F23R 3/14 |

* cited by examiner

COMBUSTOR WITH AN IGNITER PROVIDED WITHIN AT LEAST ONE OF A FUEL INJECTOR OR A COMPRESSED AIR PASSAGE

CROSS-REFERENCE TO RELATED APPLICATIONS

This application is a continuation of and claims priority to U.S. Provisional Application Ser. No. 63/291,629, filed Dec. 20, 2021 the contents of which are incorporated herein by reference.

TECHNICAL FIELD

The disclosure generally relates to a combustor for a turbine engine, and, more specifically to an igniter for the combustor.

BACKGROUND

A gas turbine engine includes a turbine that is driven by combustion of a combustible fuel within a combustor of the engine. A turbine engine utilizes a fuel injector assembly to inject the combustible fuel into the combustor. The fuel injector assembly can mix the fuel with air prior to injection in order to achieve efficient combustion.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
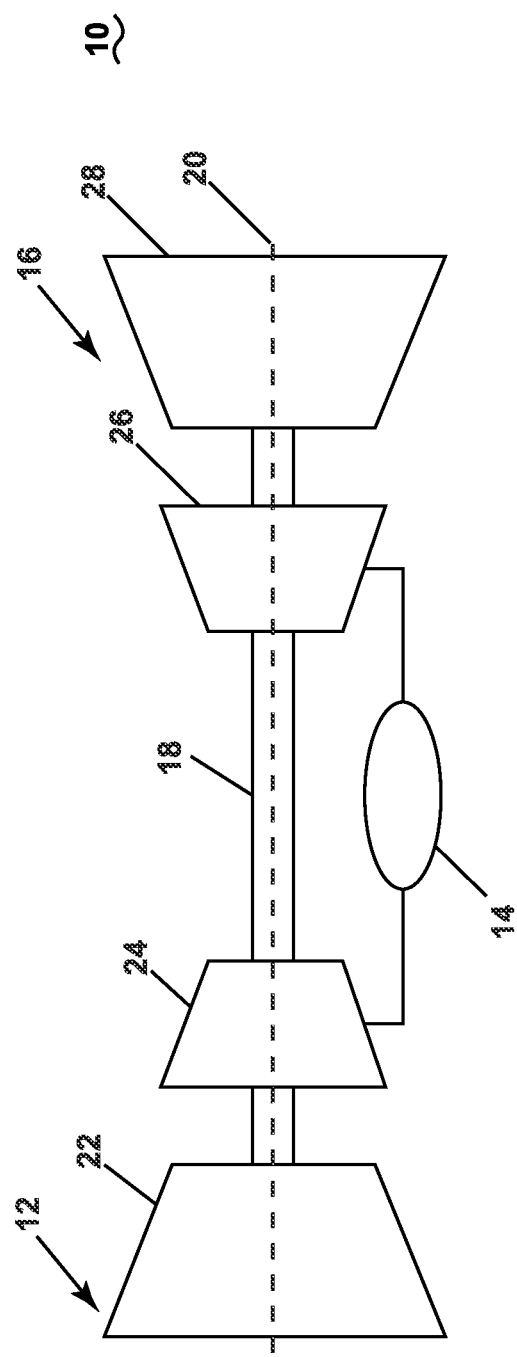
FIG. 1 is a schematic cross-sectional diagram of a turbine engine for an aircraft, the turbine engine including a combustion section.

Aspects of the disclosure described herein are generally directed to a combustion section for a turbine engine. The combustion section including a fuel injector including a flow of fuel. The fuel injector can define a fuel inlet for the combustion section. A compressed air passage including a compressed airflow can be provided within the combustion section. The compressed airflow can mix with the flow of fuel in the combustion chamber to define a fuel and air mixture. The flow of fuel of the fuel and air mixture can be ignited by at least one igniter. The flow of fuel can include any suitable fuel. As a non-limiting example, the fuel can contain hydrogen (hereinafter, hydrogen-containing fuel) that is mixed with the compressed airflow downstream of the fuel injector. Hydrogen-containing fuel typically has a wider flammable range and a faster burning velocity than traditional fuels, such as petroleum-based fuels or petroleum and synthetic fuel blends. The burn temperatures for hydrogen-containing fuel can be higher than the burn temperatures of traditional fuel, such that existing engine designs for traditional fuels would not be capable of operating under the heightened temperatures. The combustion section, as described herein, provides for an igniter suitable to ignite the hydrogen-containing fuel or the fuel and air mixture.

For purposes of illustration, the present disclosure will be described with respect to the turbine for an aircraft turbine engine. It will be understood, however, that aspects of the disclosure described herein are not so limited and may have general applicability within an engine, including compressors, power generation turbines, as well as in non-aircraft applications, such as other mobile applications and non-mobile industrial, commercial, and residential applications.

Reference will now be made in detail to the combustor architecture, and in particular the fuel injector and swirler for providing fuel to the combustor located within a turbine engine, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "forward" and "aft" refer to relative positions within a turbine engine or vehicle, and refer to the normal operational attitude of the turbine engine or vehicle. For example, with regard to a turbine engine, forward refers to a position closer to an engine and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

The singular forms "a", "an", and "the" include plural references unless the context clearly dictates otherwise. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary. The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor and turbine sections 12, 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
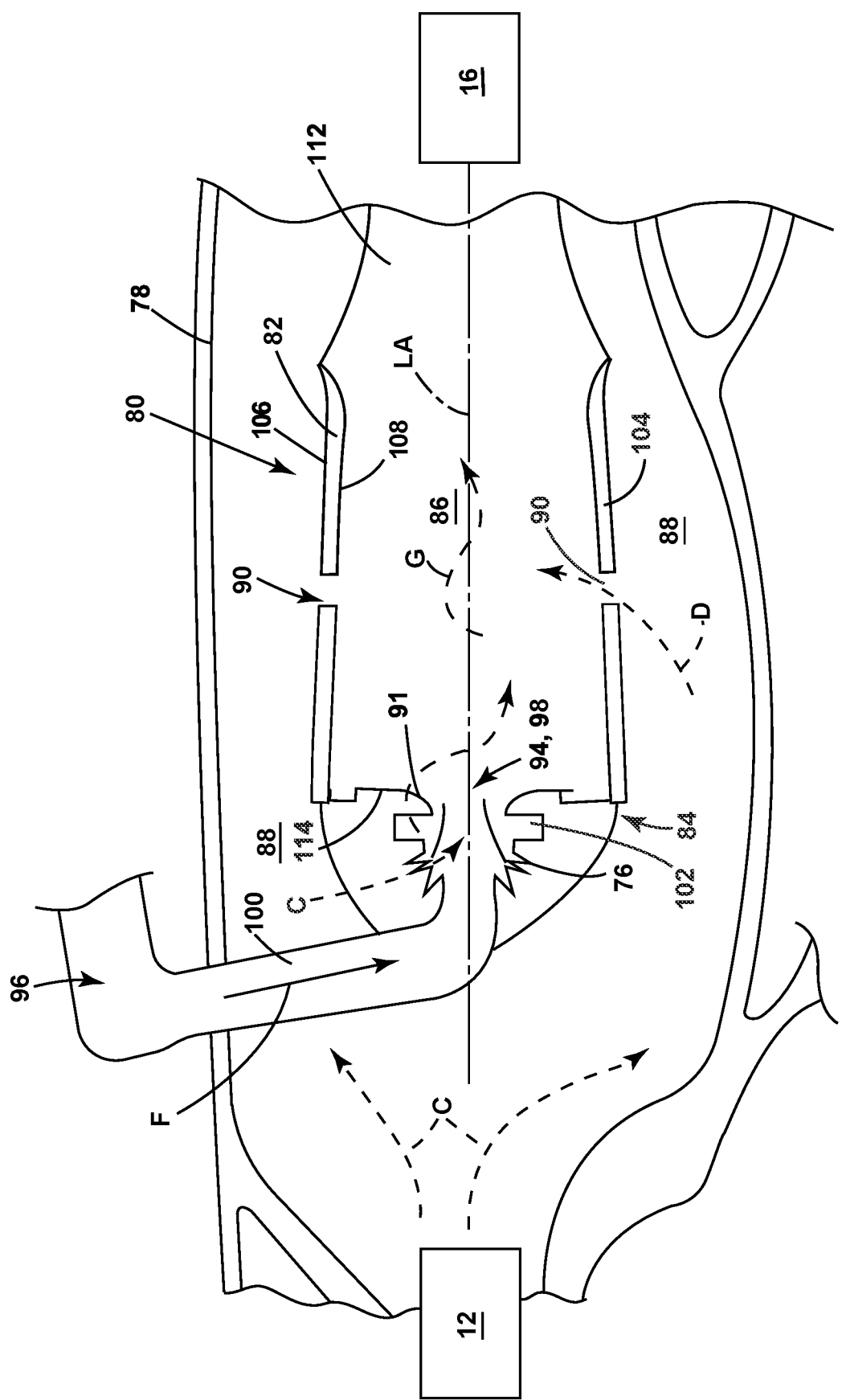
FIG. 2 is a schematic cross-sectional side view of a portion of a generic combustor suitable for use in the turbine engine of FIG. 1, further illustrating a fuel injector.

FIG. 2 depicts a schematic cross-sectional view of a generic combustion section suitable for use as combustion section 14 located between a compressor section 12 and a turbine section 16 of a turbine engine. The combustion section 14 can include an annular arrangement of fuel injectors 76 each connected to a combustor 80. It should be appreciated that the annular arrangement of fuel injectors 76 can be one or multiple fuel injectors and one or more of the fuel injectors 76 can have different characteristics and that the one fuel injector 76 is shown is for illustrative purposes only and is not intended to be limiting. The combustor 80 can have a can, can-annular, or annular arrangement depending on the type of turbine engine in which the combustor 80 is located. In a non-limiting example, an annular arrangement is illustrated and disposed within a casing 78. The combustor 80 can include an annular combustor liner 82, a dome assembly 84 including a dome wall 114 which together define a combustion chamber 86 about a longitudinal axis (LA). A compressed air passage 88 can be defined at least in part by both the annular combustor liner 82 and the casing 78. At least one fuel injector 76 is fluidly coupled to the combustion chamber 86. A passage can fluidly connect the compressed air passage 88 and the combustor 80. The passage can be defined by at least one set of dilution openings 90 located in the annular combustor liner 82.

The at least one fuel injector 76 can be coupled to and disposed within the dome assembly 84 upstream of a flare cone 91 to define a fuel outlet 94. The at least one fuel injector 76 can include a fuel inlet 96 that can be adapted to receive a flow of fuel (F) (e.g., a hydrogen-containing fuel) and a linear fuel passageway 100 extending between the fuel inlet 96 and the fuel outlet 94. A swirler 102 can be provided at a dome inlet 98 to swirl incoming air in proximity to fuel (F) exiting the at least one fuel injector 76 and provide a homogeneous mixture of air and fuel entering the combustor 80.

The annular combustor liner 82 can be defined by a wall 104 having an outer surface 106 and an inner surface 108 at least partially defining the combustion chamber 86. The wall 104 can be made of one continuous monolithic portion or be multiple monolithic portions assembled together to define the annular combustor liner 82. By way of non-limiting example, the outer surface 106 can define a first piece of the wall 104 while the inner surface 108 can define a second piece of the wall 104 that when assembled together form the annular combustor liner 82. As described herein, the wall 104 includes the at least one set of dilution openings 90. It is further contemplated that the annular combustor liner 82 can be any type of annular combustor liner 82, including but not limited to a double walled liner or a tile liner.

During operation, compressed air (C) can flow from the compressor section 12 to the combustor 80 through the compressed air passage 88. The at least one set of dilution openings 90 in the annular combustor liner 82 allow passage of at least a portion of the compressed air (C), the portion defining a dilution airflow (D), from the compressed air passage 88 to the combustion chamber 86.

Some compressed air (C) can be mixed with the fuel (F) from the at least one fuel injector 76 which can be ignited by one or more igniters (not illustrated) to generate combustion gas (G). The combustion gas (G) is mixed using the dilution airflow (D) supplied through the at least one set of dilution openings 90, and mixes within the combustion chamber 86, after which the combustion gas (G) flows through a combustor outlet 112 and exits into the turbine section 16.

Figure 3:
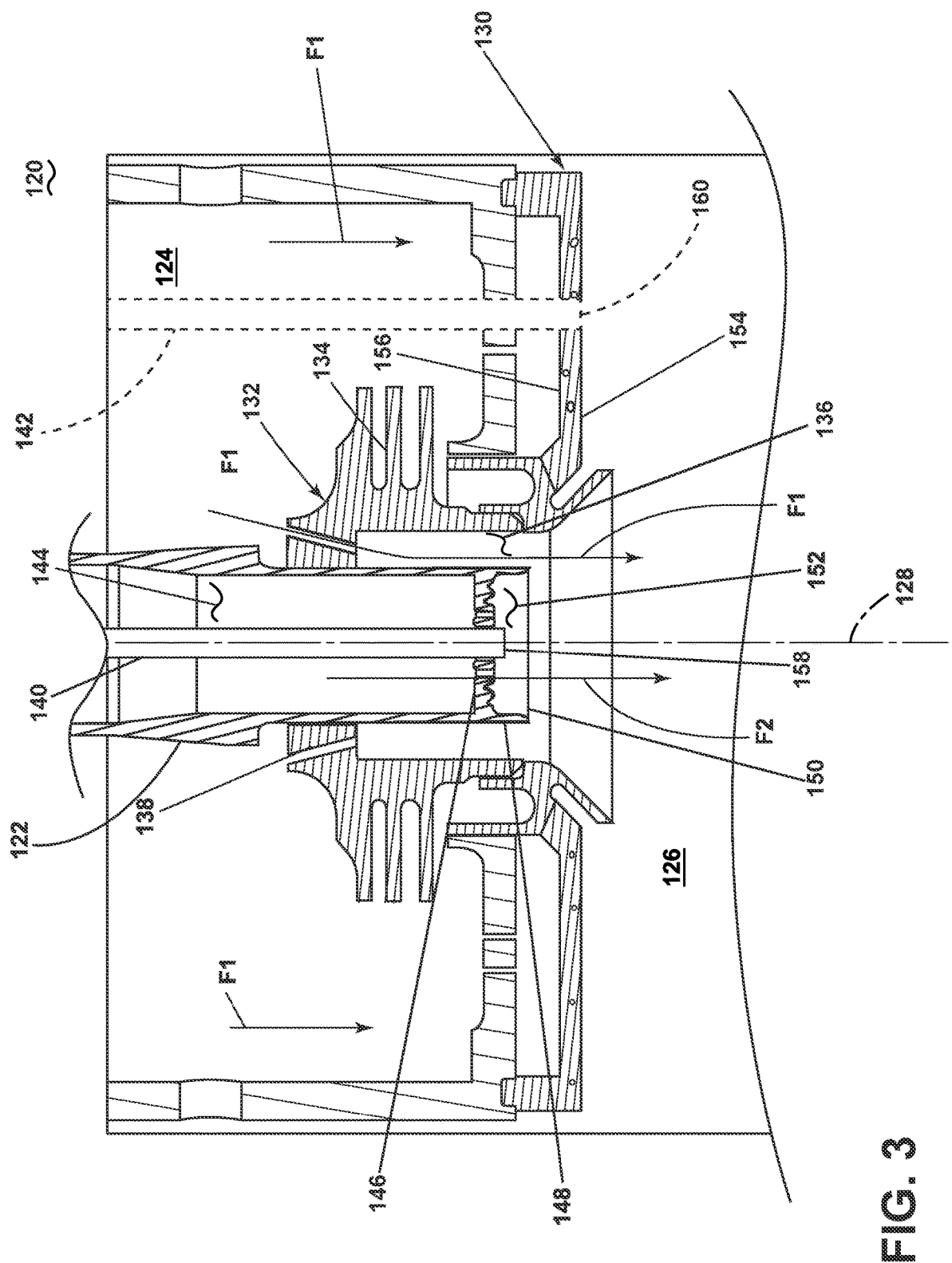
FIG. 3 is a cross-sectional side view of a fuel injector suitable for use as the fuel injector of FIG. 2, further comprising a compressed air passage and an igniter within the fuel injector and the compressed air passage.

FIG. 3 is a cross-sectional side view of a portion of a generic combustor 120 including a fuel injector 122 and a compressed air passage 124. The fuel injector 122 is suitable for use as the at least one fuel injector 76 of FIG. 2. The fuel injector 122 has at least one integrated igniter. As a non-limiting example, the fuel injector 122 has a first igniter 140 and a second igniter 142. As illustrated, the second igniter 142 can be included or otherwise not included. It will be appreciated that the first igniter 140 can also be included or otherwise not included. The at least one integrated igniter is located within the fuel injector 122, instead of downstream within the combustor chamber. The at least one integrated igniter is very suitable for use with lighter than air fuels, such a gaseous hydrogen. The integration of the igniter allows for ignition of the lighter than air fuel closer to the injector, unlike in traditional combustors that locate the igniter downstream of the injector. Lighter than air fuels tend to naturally disperse very quickly once emitted from the injector. To better control the flame, it is better to ignite the lighter than air fuel closer to the injector.

The combustor 120 includes a combustion chamber 126 suitable for use as the combustion chamber 86 of FIG. 2. The combustion chamber 126 can be defined by a longitudinal axis 128. The longitudinal axis 128 can extend in an axial direction. A dome wall 130 can be provided axially, with respect to the longitudinal axis 128, between the fuel injector 122, the compressed air passage 124, and the combustion chamber 126. The dome wall 130 can be suitable for use as the dome wall 114 of FIG. 2. The dome wall 130 can be defined by a first side 154 and a second side 156 axially opposite the first side 154. The first side 154 can confront or otherwise contact the combustion chamber 126. The second wall can be directly fluidly coupled to at least a portion of the compressed air passage 124.

The fuel injector 122 can take any suitable shape. As a non-limiting example, the fuel injector can be defined by fuel supply passage 144, which terminates at a wall 146 of the fuel injector 122 that defines an axially outer end of the fuel supply passage 144, with respect to the longitudinal axis 128. A projection 148 can extend axially outwardly from the wall 146 and terminate at an outlet 150 of the fuel injector 122. The outlet 150 can be fluidly coupled to the combustion chamber 126. An outlet cavity 152 can be demarcated by the wall 146, the projection 148, and the outlet 150. The fuel injector 122, as illustrated, can have a generally cylindrical shape when viewed along a plane normal to the longitudinal axis 128 and intersecting the fuel injector 122. It will be appreciated, however, that the fuel injector 122 can take any suitable shape such as circular, ovular, or polygonal. Further, it will be appreciated that the fuel injector 122 can have a non-constant cross-section along its axial extent.

The fuel injector 122 can extend through a portion of the compressed air passage 124. A ferrule assembly 132 housing a swirler 134 can be provided between a portion of the fuel injector 122 and the compressed air passage 124 and confront or contact the fuel injector 122. The ferrule assembly 132 and the swirler 134 can at least partially circumscribe or otherwise encase a portion of the fuel injector 122. A cavity 136 can be formed between a radially inner portion of the ferrule assembly 132 and a radially outer portion of the fuel injector 122, with respect to the longitudinal axis 128. The ferrule assembly 132 can include at least one passage 138 fluidly coupling the compressed air passage 124 to the cavity 136. The swirler 134 can be suitable for use as the swirler 102 of FIG. 2 such that it swirls at least a portion of the compressed air F1 within the compressed air passage 124 prior to it flowing through the dome wall 130 and into the combustion chamber 126.

The at least one integrated igniter can be provided within the combustor 120. As a non-limiting example, the combustor 120 can include the first igniter 140. As a non-limiting example, the combustor 120 can include the second igniter 142. As illustrated, the second igniter 142 is shown in phantom lines, meaning that the combustor 120 can include the first igniter 140 only, or the first igniter 140 and the second igniter 142. It will be appreciated, however, that the combustor 120 can also include the second igniter 142 only. As a non-limiting example, the combustor 120 can include both the first igniter 140 and the second igniter 142. The at least one integrated igniter can be any suitable igniter. As a non-limiting example, the at least one integrated igniter can be a spark igniter, a plasma igniter, blow torch, laser igniter, or any combination thereof. At least one integrated igniter can be operably coupled to a power source configured to supply a power sufficient to generate an ignition source along the at least one integrated igniter. As used herein, the term "ignition source" can refer to any product generated by the at least one integrated igniter that can result in the combustion of a fuel. As a non-limiting example, at least one integrated igniter can be the plasma igniter and ignition source can be a plasma arc or laser pulse of sufficient energy to ignite the fuel within the combustor 120. The power source can be any suitable power source such as, but not limited to, a battery, a startup generator, a laser pulse or any combination thereof.

The first igniter 140 can be provided within a portion of the fuel injector 122. The first igniter 140 can terminate axially within a portion of the fuel injector 122. As a non-limiting example, the first igniter 140 can extend through the wall 146 and terminate at a distal end 158. As a non-limiting example, the distal end 158 can be provided within the outlet cavity 152. Alternatively, the first igniter 140 can extend axially past the outlet 150 of the fuel injector 122 such that the distal end 158 is provided axially downstream of the outlet 150. As illustrated, the first igniter 140 can extend through the fuel injector 122 in a generally axial direction. It will be appreciated, however that the first igniter 140 can extend into the fuel injector 122. As a non-limiting example, the first igniter 140 can extend normal to the longitudinal axis 128 (e.g., in the radial direction) and extend through an outer radial wall of the fuel injector 122. As a non-limiting example, the first igniter 140 can extend through a different portion of the combustor 120 and terminate within a portion of the fuel injector 122 (e.g., the outlet cavity 152). As a non-limiting example, the first igniter 140 can be in line with the fuel supply passage of the fuel injector 122.

The second igniter 142 can be provided within a portion of the compressed air passage 124. As illustrated, the second igniter 142 can terminate axially at a distal end 160 coinciding with the first side 154 of the dome wall 130. It will be appreciated, however, that the distal end 160 of the second igniter 142 can be provided within the dome wall 130, axially past the first side 154 (e.g., within the combustion chamber 126), coincide with the second side 156, or axially outwardly from the second side 156 (e.g., within the compressed air passage 124). The second igniter 142 can extend through or into the compressed air passage 124 such that the distal end 160 of the second igniter 142 is provided within the combustion chamber 126. As illustrated, the second igniter 142 can extend axially through the compressed air passage 124. It will be appreciated, however that the second igniter 142 can extend into the compressed air passage 124. As a non-limiting example, the second igniter 142 can extend normal to the longitudinal axis 128 (e.g., in the radial direction) and extend through an outer radial wall of the combustor 120 that defines the compressed air passage 124. As a non-limiting example, the first igniter 140 can extend through a different portion of the combustor 120 and terminate within a portion of the compressed air passage 124. As a non-limiting example, the second igniter 142 can be in line with the compressed air passage 124.

The fuel injector 122 can be included within a plurality of fuel injectors 122. Each fuel injector of the plurality of fuel injectors 122 can be circumferentially, or radially spaced from one another with respect to the longitudinal axis 128 of the combustion chamber 126. Similarly, the compressed air passage 124 can be include within a plurality of compressed air passages 124. Each fuel injector 122 of the plurality of fuel injectors 122 can include a corresponding compressed air passage 124 of the plurality of compressed air passages 124. As a non-limiting example, complimentary pairs comprising a fuel injector of the plurality of fuel injectors 122 and a compressed air passage of the plurality of compressed air passages 124 can be formed about the dome wall 130. There can be any number of one or more fuel injectors 122. Each fuel injector of the plurality of fuel injectors 122 can be identical to one another, alternatively, at least one of the fuel injectors 122 can be formed differently with respect to the other fuel injectors 122.

Similarly, the at least one integrated igniter can be provided within a plurality of igniters including any number of first igniters 140 and second igniters 142, with it being understood that the combustor 120 includes at least one integrated igniter (e.g., at least one first igniter 140 or second igniter 142, or a combination thereof). Each igniter of the plurality of igniters can be provided within a different portion of the combustor 120. As a non-limiting example, the plurality of igniters can include a plurality of first igniters 140 provided within a corresponding fuel injector of the plurality of fuel injectors 122. As such, there can be an equal number of first igniters 140 to the number of the fuel injectors 122. Alternatively, only a portion of the plurality of fuel injectors 122 can include an igniter. As a non-limiting example, only one of the fuel injectors of the plurality of fuel injectors 122 can include a first igniter 140, while the remaining fuel injectors 122 do not include a first igniter 140. As a non-limiting example, every other or every third fuel injector 122 can include a respective first igniter 140. It will be appreciated that there can be any number of pattern of first igniters 140 or second igniters 142 corresponding to the fuel injectors 122 or compressed air passage(s) 124, respectively.

During operation of the combustor 120, the compressed air passage 124 can include a compressed airflow (F1) suitable for use as the compressed airflow (C) of FIG. 2. The fuel injector 122 can include a fuel supply passage having a fuel defining a flow of fuel (F2) suitable for use as the fuel (F) of FIG. 2. The flow of fuel (F2) can be a hydrogen-containing fuel. The compressed airflow (F1) can flow form the compressed air passage 124, through the at least one passage 138 and into the cavity 136 of the ferrule assembly 132. The flow of fuel (F2) can flow through the fuel supply passage 144 and ultimately out the outlet 150 of the fuel injector 122. The compressed airflow (F1) and the flow of fuel (F2) can be mixed downstream of the swirler ferrule assembly 132 to define a fuel and air mixture of the fuel (F2) and compressed airflow (F1) within the combustion chamber 126. The at least one integrated igniter can ignite at least one of the fuel and air mixture and/or the flow of fuel (F2) near the outlet 150. As a non-limiting example, the first igniter can ignite the flow of fuel (F2). As a non-limiting example, the second igniter can ignite the mixture of the fuel and compressed air within the combustion chamber 126.

As discussed, herein, the fuel injector 122 can be included within the plurality of fuel injectors 122, with only one or a portion of the fuel injectors 122 including a respective first igniter 140. As such, only the flow of fuel (F2) within the fuel injectors 122 including a first igniter 140 will be directly ignited. It is contemplated that the ignition of one flow of fuel (F2) can be suffice to ignite the other flows of fuel (F2) with the other fuel injectors 122, or ignite the fuel and air mixture within the combustion chamber 126. As such, a single igniter can be used to ignite all of the flows of fuel (F2) or the fuel and air mixture.

As a non-limiting example, only one fuel injector 122 of the plurality of fuel injectors 122 can include a respective first igniter 140. This one fuel injector 122 will be referred to as the ignition fuel injector. During operation, the flow of fuel (F2) can be fed to the ignition fuel injector prior to the remaining fuel injectors 122 receiving their respective flow of fuel (F2). The flow of fuel (F2) of the ignition fuel injector can be ignited by the first igniter 140. The ignited flow of fuel (F2) can them mix with the compressed air (F1) and extend into the combustion chamber 126 as a flame. Once this occurs, the remaining fuel injectors 122 without the first igniter 140 can be fed their respective flow of fuel (F2), which can be mixed with the compressed air (F1) to define the fuel and air mixture, which can then enter the combustion chamber 126 where the flame is present. The flame can then ignite the fuel and air mixture. As such, combustion can occur within the combustion chamber 126 through the use of only a single igniter.

Benefits of the present disclosure include a combustor that includes a hydrogen-containing fuel. Hydrogen-containing fuels have a higher flame temperature than traditional fuels (e.g., fuels not containing hydrogen). That is, hydrogen or a hydrogen mixed fuel typically has a wider flammable range and a faster burning velocity than traditional fuels such as petroleum-based fuels, or petroleum and synthetic fuel blends. Further, the hydrogen within the hydrogen-containing fuel is a compressible gas. As such, the flow of fluid can oscillate and interact with combustion dynamics of the combustor. This, in turn, can increase the overall combustion dynamics of the combustor. As used herein, the term "combustion dynamics" or iterations thereof, can refer to the generation of acoustic pressure oscillations that occur within the combustor from the ignition of the fuel and air mixture within the combustion chamber. Conventional combustors include an ignitor that extends through the combustor liner. These ignitors can be provided downstream of where the fuel and air mixture is introduced to the combustion chamber. The unignited mixture (e.g., upstream of the igniter) can oscillate and enhance or increase the combustion dynamics once the mixture is ignited. Further, the ignition of the mixture can result in an increase of pressure of heat within the combustor. It is contemplated that reducing, eliminating, or otherwise controlling the combustion dynamics, release of heat, or release of pressure generated form the ignition of the mixture can provide for a combustor that can effectively use hydrogen-containing fuel as a fuel source. The combustor, as described herein, however, includes the at least one igniter that extends through or into the compressed air passage, or the fuel injector. In other words, the combustor, as described herein, provides an ignition source that is upstream of the combustion chamber (e.g., at the outlet of the fuel injector) or at an upstream portion of the combustion chamber where the fuel and air mixture is introduced to the combustion chamber. As the ignition occurs upstream of where the ignition would occur in the conventional combustion section, the combustion dynamics can be reduced. Further, the location of the release of pressure and heat or the total pressure and heat release can be reduced. The combustion dynamics, release of pressure and heat can limit the life span of the combustion section, and ultimately the turbine engine. As such, the turbine engine including the combustion section as described herein has a greater life span than a conventional combustion section if a hydrogen-containing fuel were to be used with it. Further benefits associated with the use of hydrogen-containing fuel rather than traditional fuels is that hydrogen-containing fuel, when combusted, generates less pollutants without sacrificing engine performance when compared to the traditional fuels. As such, the combustion section having the hydrogen-containing fuel, rather than the traditional fuel, results in a more eco-friendly turbine engine that produces less pollutants when compared to a conventional turbine engine.

Further benefits associated with the disclosure include a more efficient combustor when compared to a conventional combustor. For example, conventional combustors can include an igniter or a plurality of igniters that extend through the combustor wall and ignite the fuel and air mixture after it has already entered the combustion chamber. The combustion section, as described herein, however, can include a single igniter provided within a single fuel injector. The method and system of introducing the flow of fuel to the fuel injector that includes the igniter, and igniting the flow of fuel before the flow of fuel is introduced to the remaining fuel injectors (e.g., those without an igniter) allows for single igniter to be used to ignite the full fuel and air mixture within the combustion chamber. As such, the combustion section as described herein is a less complicated system when compared to the conventional combustion section. Further, the few number of igniters, the less power that is needed to produce the ignition sources of the igniters. This, in turn, results in a more efficient turbine engine when compared to a conventional turbine engine.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A turbine engine comprising a compressor section, a combustion section having a combustor, and a turbine section in serial flow arrangement, the combustor comprising a combustion chamber, at least one fuel injector having a fuel supply passage supplying fuel to the combustion chamber, at least one compressed air passage supplying a compressed airflow from the compressor section to the combustion chamber where it mixes with the fuel to form a fuel and air mixture, and at least one igniter provided within a portion of at least one of the at least one fuel injector or the at least one compressed air passage and configured to ignite the mixture.

The turbine engine of any preceding clause, wherein the at least one igniter extends through a portion of the at least one fuel injector and terminates at a distal end coinciding with, upstream of or downstream of an end of the at least one fuel injector.

The turbine engine of any preceding clause, wherein the at least one igniter is in line with the fuel supply passage or extends through a wall of the at least one fuel injector and into the fuel supply passage.

The turbine engine of any preceding clause, wherein the combustion chamber defines a longitudinal axis, and the combustor further comprises a dome wall defining an axially forward portion of the combustion chamber, with respect to the longitudinal axis, the dome wall having a first side confronting the combustion chamber and a second side confronting at least portion of the at least one compressed air passage.

The turbine engine of any preceding clause, wherein the at least one igniter is provided within a portion of the at least one compressed air passage and extends through at least a portion of the dome wall.

The turbine engine of any preceding clause, wherein the at least one igniter terminates at a distal end coinciding with the second side of the dome wall.

The turbine engine of any preceding clause, wherein the at least one igniter is in line with the at least one compressed air passage or extends through a wall of the at least one compressed air passage.

The turbine engine of any preceding clause, wherein the at least one compressed air passage is included within a plurality of compressed air passages and the at least one fuel injector is one fuel injector included within a plurality of fuel injectors, wherein there are complimentary pairs of compressed air passages and fuel injectors.

The turbine engine of any preceding clause, wherein the plurality of fuel injectors are circumferentially spaced from one another about the dome wall and with respect to the longitudinal axis.

The turbine engine of any preceding clause, wherein the plurality of fuel injectors are circumferentially and radially spaced from one another about the dome wall and with respect to the longitudinal axis.

The turbine engine of any preceding clause, wherein the at least one igniter is only provided in a single compressed air passage of the plurality of compressed air passages or a single fuel injector of the plurality of fuel injectors.

The turbine engine of any preceding clause, wherein during startup of the turbine engine, the fuel is only supplied to the single fuel injector, and wherein the at least one igniter ignites a fuel and air mixture from the single fuel injector and a corresponding compressed air passage prior to the fuel being supplied to the remaining fuel injectors of the plurality of fuel injectors.

The turbine engine of any preceding clause, wherein the at least one igniter is included within a plurality of igniters provided within a portion of the plurality of fuel injectors or the plurality of compressed air passages.

The turbine engine of any preceding clause, wherein the at least one igniter is included within a plurality of igniters provided within the at least one fuel injector and the compressed air passage.

The turbine engine of any preceding clause, wherein the plurality of igniters includes a first igniter provided within a portion of the at least one fuel injector and a second igniter provided within a portion of the at least one compressed air passage.

The turbine engine of any preceding clause, wherein the fuel includes a hydrogen-containing fuel.

The turbine engine of any preceding clause, wherein the combustor further comprises a dome wall having a first side confronting the combustion chamber and a second side confronting at least portion of the at least one compressed air passage, and a swirler circumscribing at least a portion of the at least one fuel injector, and configured to swirl at least a portion of the compressed air within the compressed air passage prior to it being mixed with the fuel downstream of the at least one fuel injector, wherein the at least one igniter extends through at least one of the dome wall or the at least one injector.

The turbine engine of any preceding clause, wherein the combustion chamber defines a longitudinal axis and the turbine engine further comprises a plurality of fuel injectors having the at least one fuel injector, a plurality of compressed air passages having the at least one compressed air passage, and wherein there are complimentary pairs of compressed air passages and fuel injectors, and wherein the complimentary pairs are circumferentially spaced about the dome wall with respect to the longitudinal axis.

The turbine engine of any preceding clause further comprising a plurality of igniters including the at least one igniter.

The turbine engine of any preceding clause, wherein two or more complimentary pairs include at least one igniter of the plurality of igniters.

What is claimed is:

1. A turbine engine comprising:
    a compressor section, a combustion section having a combustor, and a turbine section in serial flow arrangement, the combustor comprising:
    a combustion chamber defining a longitudinal axis;
    at least one fuel injector having a fuel injector outlet and a fuel supply passage supplying fuel to the combustion chamber;
    at least one compressed air passage supplying a compressed airflow from the compressor section to the combustion chamber where it mixes with the fuel to form a fuel and air mixture, with the at least one fuel injector being provided within a portion of the at least one compressed air passage;
    a dome wall having a first side defining at least a portion of the combustion chamber, and a second side defining at least a portion of the at least one compressed air passage;
    a swirler circumscribing at least a portion of the at least one fuel injector;
    a flare cone provided along and extending though a respective portion of the dome wall and having an outlet exhausting to the combustion chamber, with the outlet being provided downstream of both of the swirler and the fuel injector outlet; and
    at least one igniter provided within a portion of at least one of the at least one fuel injector or the at least one compressed air passage.

2. The turbine engine of claim 1, wherein the at least one igniter extends through at least a portion of the dome wall.

3. The turbine engine of claim 2, wherein the at least one igniter is in line with the at least one compressed air passage or extends through a wall of the at least one compressed air passage.

4. The turbine engine of claim 1, wherein the at least one compressed air passage is included within a plurality of compressed air passages and the at least one fuel injector is one fuel injector included within a plurality of fuel injectors, wherein there are complimentary pairs of compressed air passages and fuel injectors.

5. The turbine engine of claim 4, wherein the plurality of fuel injectors are circumferentially spaced from one another about the dome wall and with respect to the longitudinal axis.

6. The turbine engine of claim 4, wherein the plurality of fuel injectors are circumferentially and radially spaced from one another about the dome wall and with respect to the longitudinal axis.

7. The turbine engine of claim 4, wherein during startup of the turbine engine, the fuel is only supplied to a single fuel injector of the plurality of fuel injectors, and wherein the at least one igniter ignites a fuel and air mixture from the single fuel injector and a corresponding compressed air passage prior to the fuel being supplied to the remaining fuel injectors of the plurality of fuel injectors.

8. The turbine engine of claim 4, wherein the at least one igniter is included within a plurality of igniters provided within a portion of the plurality of fuel injectors or the plurality of compressed air passages.

9. The turbine engine of claim 1, wherein the fuel includes a hydrogen-containing fuel.

10. The turbine engine of claim 1, wherein the at least one igniter terminates at a distal end provided axially prior to or coinciding with an axial start of the combustion chamber.

11. A turbine engine comprising:
a compressor section, a combustion section having a combustor, and a turbine section in serial flow arrangement, the combustor comprising:
a combustion chamber defining a longitudinal axis and having a dome wall defining an axially forward portion of the combustion chamber, with respect to the longitudinal axis, the dome wall having a first side confronting the combustion chamber and a second side;
at least one fuel injector having a fuel supply passage supplying a fuel to the combustion chamber;
at least one compressed air passage supplying a compressed airflow from the compressor section to the combustion chamber where it mixes with the fuel to form a fuel and air mixture, the compressed air passage confronting at least portion of the second side of the dome wall; and
a plurality of igniters provided within the at least one fuel injector and the compressed air passage, the plurality of igniters including a first igniter provided within a portion of the at least one fuel injector and a second igniter provided within a portion of the at least one compressed air passage.

12. A turbine engine comprising:
a compressor section, a combustion section having a combustor, and a turbine section in serial flow arrangement, the combustor comprising:
a combustion chamber defining a longitudinal axis and having a dome wall defining an axially forward portion of the combustion chamber, with respect to the longitudinal axis;
at least one fuel injector having a fuel supply passage supplying fuel to the combustion chamber;
at least one compressed air passage supplying a compressed airflow from the compressor section to the combustion chamber where it mixes with the fuel to form a fuel and air mixture, the compressed air passage confronting at least portion of the dome wall; and
at least one igniter provided within a portion of the at least one fuel injector or the at least one compressed air passage, the at least one igniter terminating at a distal end provided along and extending into at least a portion of the dome wall.

13. The turbine engine of claim 12, wherein the at least one igniter is in line with the fuel supply passage or extends through a wall of the at least one fuel injector and into the fuel supply passage.

14. The turbine engine of claim 12, wherein the at least one igniter is included within a plurality of igniters provided within the at least one fuel injector and the compressed air passage.

15. The turbine engine of claim 12, wherein the combustor further comprises:
a dome wall having a first side confronting the combustion chamber and a second side confronting at least portion of the at least one compressed air passage; and
a swirler circumscribing at least a portion of the at least one fuel injector, and configured to swirl at least a portion of the compressed airflow within the compressed air passage prior to it being mixed with the fuel downstream of the at least one fuel injector.

16. The turbine engine of claim 15, further comprising:
a plurality of fuel injectors having the at least one fuel injector; and
a plurality of compressed air passages having the at least one compressed air passage;
wherein there are complimentary pairs of compressed air passages and fuel injectors, and wherein the complimentary pairs are circumferentially spaced about the dome wall with respect to the longitudinal axis.

17. The turbine engine of claim 16, further comprising a plurality of igniters including the at least one igniter.

18. The turbine engine of claim 17, wherein two or more complimentary pairs include at least one igniter of the plurality of igniters.

19. The turbine engine of claim 15, wherein the at least one fuel injector is included within a plurality of fuel injectors, wherein during startup of the turbine engine, the fuel is only supplied to a single fuel injector of the plurality of fuel injectors, and wherein the at least one igniter ignites a fuel and air mixture from the single fuel injector and a corresponding compressed air passage prior to the fuel being supplied to the remaining fuel injectors of the plurality of fuel injectors.

20. The turbine engine of claim 12, wherein the dome wall includes a first side confronting the combustion chamber and a second side confronting the at least one compressed air passage, with the distal end being provided along the first side.

* * * * *

UNITED STATES PATENT AND TRADEMARK OFFICE
CERTIFICATE OF CORRECTION

Page 1 of 1

PATENT NO. : 11,795,879 B2
APPLICATION NO. : 17/589145
DATED : October 24, 2023
INVENTOR(S) : Krishnakumar Venkatesan, Michael A. Benjamin and Michael T. Bucaro It is certified that error appears in the above-identified patent and that said Letters Patent is hereby corrected as shown below:

In the Claims

Column 12, Claim 1, Line 30, insert -- a -- before "fuel", second occurrence.

Column 13, Claim 12, Line 45, insert -- a -- before "fuel".

Signed and Sealed this
Nineteenth Day of November, 2024

Katherine Kelly Vidal
*Director of the United States Patent and Trademark Office*